United States Patent
Shen et al.

(10) Patent No.: US 9,667,126 B2
(45) Date of Patent: May 30, 2017

(54) MOTOR

(71) Applicant: Shanghai Langham Automatic Co., Ltd., Shanghai (CN)

(72) Inventors: Xihe Shen, Shanghai (CN); Ningning Lao, Shanghai (CN)

(73) Assignee: LANGHAM AUTOMATIC CO., LTD., Shanghai (CN)

( * ) Notice: Subject to any disclaimer, the term of this patent is extended or adjusted under 35 U.S.C. 154(b) by 253 days.

(21) Appl. No.: 14/715,881

(22) Filed: May 19, 2015

(65) Prior Publication Data
US 2016/0197540 A1 Jul. 7, 2016

(30) Foreign Application Priority Data

Jan. 5, 2015 (CN) .......................... 2015 1 0005569
Jan. 5, 2015 (CN) .......................... 2015 1 0005572

(51) Int. Cl.
*H02K 16/02* (2006.01)
*H02K 17/16* (2006.01)
*H02K 99/00* (2014.01)

(52) U.S. Cl.
CPC ............. *H02K 16/02* (2013.01); *H02K 17/16* (2013.01); *H02K 99/20* (2016.11)

(58) Field of Classification Search
CPC .................................................... H02K 16/02
See application file for complete search history.

(56) References Cited

U.S. PATENT DOCUMENTS

| | | | | | |
|---|---|---|---|---|---|
| 3,293,460 | A | * | 12/1966 | Iwai ........................ | H01H 67/06 310/164 |
| 4,358,693 | A | * | 11/1982 | Palmer .................... | H02K 25/00 310/112 |
| 4,626,719 | A | * | 12/1986 | Foster ..................... | H02K 37/04 310/114 |
| 5,675,203 | A | * | 10/1997 | Schulze ................... | B60K 6/26 310/103 |
| 5,838,135 | A | * | 11/1998 | Satake .................... | H02K 16/00 310/112 |
| 6,316,858 | B1 | * | 11/2001 | Phillips ................... | H02K 16/02 15/377 |
| 6,472,788 | B1 | * | 10/2002 | Nakano .................... | H02K 1/14 310/112 |
| 6,624,545 | B1 | * | 9/2003 | Furuse .................... | H02K 16/02 310/114 |
| 6,700,272 | B1 | * | 3/2004 | Lindner ................... | H02K 1/12 310/166 |

(Continued)

*Primary Examiner* — Robert W Horn
(74) *Attorney, Agent, or Firm* — CBM Patent Consulting, LLC

(57) ABSTRACT

A digital motor comprising a stator, an internal rotor and an external rotor; wherein the internal rotor is embedded into the external rotor, with a cavity provided between the internal and external rotors; the cavity is filled with magnetic phase-change material. The asynchronous motor comprising a rotor and a stator; the asynchronous motor adopts two groups of rotor-stator structures that are arranged coaxially; one group is a driving rotor-stator structure, including a primary stator and a primary rotor; the primary rotor is formed by embedding a primary inner rotor into a primary outer rotor, phase-change magnetic materials are filled into a cavity between the primary inner rotor and the primary outer rotor.

13 Claims, 2 Drawing Sheets

(56) References Cited

U.S. PATENT DOCUMENTS

| | | | | |
|---|---|---|---|---|
| 6,815,857 B2* | 11/2004 | Akatsu | ................... | H02K 1/276 310/112 |
| 6,848,165 B1* | 2/2005 | Furuse | ................... | H02K 16/02 29/596 |
| 7,893,579 B2* | 2/2011 | Rudel | ................... | H02K 29/08 310/156.05 |
| 8,222,784 B2* | 7/2012 | Serra | ....................... | B60K 1/04 310/114 |
| 9,318,941 B2* | 4/2016 | Vezain | ................... | H02K 37/14 |
| 9,331,534 B2* | 5/2016 | Yost | ..................... | H02K 1/2793 |
| 9,479,037 B2* | 10/2016 | Bailey | ................. | H02K 21/024 |
| 9,496,768 B2* | 11/2016 | Rens | ..................... | H02K 7/11 |
| 2012/0035014 A1* | 2/2012 | Moeller | ................ | B60K 6/445 475/5 |
| 2014/0062379 A1* | 3/2014 | Dai | ........................ | H02P 25/08 318/701 |
| 2014/0111038 A1* | 4/2014 | Yang | ..................... | H02K 16/00 310/46 |
| 2014/0152129 A1* | 6/2014 | Vezain | ................... | H02K 37/14 310/49.44 |
| 2015/0229186 A1* | 8/2015 | Sauer | ..................... | B23P 15/26 310/54 |
| 2015/0343588 A1* | 12/2015 | Weiss | ..................... | F28D 15/00 409/135 |
| 2015/0372545 A1* | 12/2015 | Lucchi | .................... | H02K 1/28 310/216.005 |
| 2016/0036366 A1* | 2/2016 | Yang | ..................... | H02K 29/03 318/701 |
| 2016/0197540 A1* | 7/2016 | Shen | ..................... | H02K 16/02 310/125 |
| 2016/0241123 A1* | 8/2016 | Ohhashi | ................. | F16H 49/00 |
| 2016/0268866 A1* | 9/2016 | Matsumoto | ............ | H02K 21/24 |
| 2017/0012491 A1* | 1/2017 | Schob | ..................... | H02K 7/09 |
| 2017/0047833 A1* | 2/2017 | Ikeuchi | .................. | H02K 21/12 |

* cited by examiner

MOTOR

This application claims priority to Chinese Patent Application Ser. No. 201510005572.3 and 201510005569.1 filed 5 Jan. 2015.

TECHNICAL FIELD

The present invention relates to power and control technology field, specifically to a motor which is applicable to traditional small and medium-sized motors, and especially applicable to use cases that motors are frequently started up, large in load change, big in locked-rotor torque and controllable in locked-rotor current, requiring displacement of equipment as well as automatic and integrated operation.

BACKGROUND ART

The motor products in prior art can be divided into two kinds based upon technical level. One is the traditional AC or DC motor, which have long history and various of types and adopt traditional electric control methods in use; the other one is advanced stepping motor and servo motor, mainly applied to high-precision technical field, such as computer numerical control machine tool, machining center equipment and robot equipment; these products adopt basically control technology with signal feedback, integrated control and man-machine communication as the core.

The traditional AC motor product, which is mature in technology and wide in application, has developed to a degree of technical standard and large-scale industrialization. However, because the functions are simple and low in technical content, these motors have only simple function of transforming electric energy to mechanical energy. In actual application, it requires peripheral circuits and support devices for functions like overcurrent protection, load starting, time control, clutch braking and automatic control and so on. The traditional motors have problems of low value, excessive parts, complex maintenance and high comprehensive cost and so on, and the biggest disadvantage is that the product is difficult to realize technology development and improvement, so it is in urgent need of innovation to adapt new market requirement.

Along with industrial development, the modern high-end product and parts require higher precision. Because of using advanced electrical control technology, the stepping motor has high running precision and using performance, which is much more advanced than the traditional motors. However, the stepping motor also has its disadvantages and boundedness, for example, the stepping motor adopts open loop control, without measuring the speed, so it is low in resolution and control precision; besides, it is low in output power and limited in application range, so it is generally suitable for application of small load.

Based on different rotor structures, three-phase asynchronous motors can be divided into motors with squirrel-cage type rotor and motors with wound type rotor. The squirrel-cage type motor is widely used because of the simple structure, operational reliability, low weight, low price, energy-saving and high efficiency advantages; however, it is difficult to regulate the velocity. Both of the rotor and the stator of the wound type motor are provided with three-phase winding, and are connected with an outer rheostat through a slip ring and an electric brush, thus it can regulate startup performance and rotating speed of the motor by regulating the rheostat; however, it has disadvantages of complex structure, easy-to-damage parts, high price and difficult maintenance problems. At present, application of the traditional three-phase asynchronous motor mainly relies on electric control methods, for example, overcurrent protection, star-delta reduced-voltage starting, and voltage variable frequency starting and so on. The traditional control methods have problems of complex circuit, redundant parts and high maintenance cost. Because the traditional motor is simple in function, low in technical level, without startup protection, overcurrent protection, signal collection and feedback function, the products are difficult to win in the high-end market competition. The traditional motor technology can barely adapt the development requirement of the market.

Because the servo motor adopts closed-loop control method, it is easy to realize speed regulation, torque regulation, stable high-speed running and high position precision, so as to meet various requirements of motor control. However, the servo motor products are complex in structure and circuit and high in production cost; because it is limited by the high-power current, power of the servo motor is relatively small; it is necessary to solve the problems like heat dissipation, magnet isolation, self-locking and light weight of mobile parts before use, so it is complex in use, operation and maintenance; the servo motor is mainly applied on high-precision industrial equipment (for example, CNC and robot), so it is not suitable for common-precision power equipment (for example, production line and general industrial equipment), which is of the highest in demand; the servo motor is high in price, difficult to operate and small in application range; so it is limited in popularization and application. Along with industrial development, the service environment of motors has changed a lot, and the market has higher requirement on motors. Manual operation technology is gradually replaced by automation technology, and the traditional motor cannot meet the requirement of modern industry. The market needs a lot of advanced, innovative, economic, practical, generally applicable, energy-saving and reliable new motors.

SUMMARY OF THE INVENTION

To meet requirement of modern industrial market on motors, the present invention designs a motor that can adapt market requirement of industrial development, and can realize functions like self-protection and closed-loop control.

In order to achieve the above objectives, the present invention provides a motor, comprising a stator, an internal rotor and an external rotor, wherein the internal rotor is embedded into the external rotor, with a cavity provided between the internal and external rotors; the cavity is filled with magnetic phase-change material; the stator is provided outside of the external rotor, while the internal rotor is connected with output shaft of the motor; after switching on the power, the external rotor is driven by a rotating magnetic field generated by the stator to rotate at first, and then the internal rotor is driven by a rotating magnetic field generated by the external rotor to rotate; as a result, the motor shaft is driven to rotate and output kinetic energy, and the internal rotor generates induced electromagnetic field while rotating; the internal and external rotors automatically regulate magnetic phase and form a closed magnetic circuit, because the magnetic phase-change material is filled in the cavity between the internal and external rotors, when the motor is running after switching on the power, a flexible driving force is generated from the external rotor to the internal rotor, so as to realize flexible output of power of the motor shaft.

The specific structure of the motor is as follows:

inserting and fixing the motor shaft into the internal rotor to form an internal rotor assembly; arranging the bearing and the framework oil seal into the rotor bearing end plate to form a rotor bearing end plate assembly; inserting the internal rotor assembly into the external rotor, two ends of which are provided with the rotor bearing end plate assemblies; filling the phase-change magnetic material into the gap between the internal and external rotors to form a rotor component;

embedding the wound stator coil into the stator iron core to form a stator component;

arranging the bearing into the front end cover and the rear end cover to form a motor enclosure end cover component;

connecting the shielding signal cable with the grating encoder and the low voltage wiring board to form a sensor component;

arranging the stator component into the motor enclosure, inserting the shielding signal cable into the motor enclosure through the stator iron core trunking, inserting the rotor component into the stator component, inserting the motor shaft into the motor enclosure end cover component in terms of the front and rear position and fixing it on two end surfaces of the motor enclosure; inserting the grating encoder through the motor shaft and fixing on the rear end cover of motor, arranging the low voltage wiring board inside of the junction box; connecting the grating encoder and the low voltage wiring board with the shielding signal cable, and arranging and fixing the fan blade into rear part of the motor shaft; fixedly arranging the rear fan cover on the rear end cover of the motor, and fixing the junction box cover, thus to form the complete machine product.

The phase-change magnetic material is used as kinetic flexible transmission medium that is filled in the gap between the internal and external rotors.

The internal rotor component and external rotor are connected by the bearing.

The external rotor is a squirrel-cage type rotor or a permanent magnetic rotor, and the internal rotor is the squirrel-cage type rotor.

The motor has starting protection and overcurrent protection, at the conditions of double rated power, 55 Kp/cm2 shearing stress of phase-change material, 30 N/m locked-rotor torque, external rotor idling and internal rotor stalling, the starting peak value and overcurrent are both lower than double rated motor current.

The motor adopts a "one stator and two rotors" structure, which has an embedded "external squirrel-cage type rotor and internal squirrel-cage type rotor" structure or an embedded "external permanent magnetic rotor and internal squirrel-cage type rotor" structure, so the motor generates asynchronous rotating magnetic field after switching on the power for two times, including a stator exciting field, an external rotor magnetic field, and an internal rotor magnetic field in order, so as to drive internal rotor and motor shaft to rotate and output kinetic energy; because phase-change magnetic materials prepared according to different magnetic intensity requirements are filled inside of the cavity between the internal and external rotors, so the external rotor generates flexible driving force to the internal rotor when the motor is running, by using and changing feature of the phase-change magnetic material, the motor has the function of automatically limiting current, controlling temperature raise, flexible transmission (starting), overload protection, high efficiency and energy saving performance. The signal source of motor adopts embedded high-resolution position encoder, which can precisely feed back the real-time running state of load; through host computer and standard electrical control system, it is convenient to set automatic functions of motor, such as failure warning, running time, circulation time, displacement distance and rotating direction.

the present invention also provides another motor, comprising a rotor and a stator, wherein the motor adopts two groups of rotor-stator structures that are arranged coaxially; one group is a driving rotor-stator structure, including a primary stator and a primary rotor; the primary rotor is formed by embedding a primary inner rotor into a primary outer rotor, phase-change magnetic materials are filled into a cavity between the primary inner rotor and the primary outer rotor, and the primary inner rotor is connected with an output shaft of the motor; after switching on the power of the primary stator coil, the alternating current motor generates asynchronous rotating magnetic field of the primary stator, the primary outer rotor and the primary inner rotor for two times; because liquid phase-change magnetic materials are filled between the inner and outer rotors, the primary outer rotor generates flexible driving force to the primary internal rotor and the motor shaft; the other group is a controlling stator structure comprising a secondary stator and a secondary rotor, and the secondary rotor is arranged coaxially with the primary inner rotor.

The specific structure of the motor is as follows:

inserting and fixing the motor shaft into the primary internal rotor, embedding the primary inner rotor into the primary outer rotor, arranging a rotor bearing and a frame oil seal into a rotor end cover, fixedly arranging the rotor end cover on two ends of the primary outer rotor, filling the phase-change magnetic materials into the gap between the inner and outer rotors, arranging the motor shaft through the secondary rotor, to form a rotor component;

embedding the wound primary and secondary stator coils into the primary and secondary stator iron cores to form a stator component;

arranging a high voltage wiring pile, a driving circuit board and an integrated control panel to form a control component;

arranging the bearing into the front end cover and the rear end cover to form a motor enclosure end cover component;

connecting the shielding signal cable with wiring terminals of the grating encoder and the low voltage circuit board to form a sensor component;

arranging the stator component into the motor enclosure, arranging the control component into the junction box, inserting the shielding signal cable through the rear end cover of motor and the enclosure trunking to connect a low voltage wiring terminal; inserting the rotor component into the stator component, with the primary and secondary stators being in accordance with the primary and secondary rotors; connecting the primary stator coil with the high voltage wiring pile and connecting the secondary coil with the driving circuit board; inserting the motor shaft into the motor enclosure end cover component in terms of the front and rear position and fixing it on two end surfaces of the motor enclosure; inserting the grating encoder through the motor shaft and fixing on the rear end cover of motor; connecting the grating encoder with the shielding signal cable, and arranging and fixing the fan blade into rear part of the motor shaft; fixedly arranging the rear fan cover on the rear end cover of the motor, and fixing the junction box cover, thus to finish arranging the complete machine product.

The controlling stator and rotor structure is comprised of the secondary stator and the secondary rotor; when switching on the power of the secondary stator coil, the secondary rotor generates rotating torque with same direction of the primary rotor; if rotating frequency of the secondary rotor is higher than that of the primary rotor, it generates acceleration to the motor shaft; if rotating frequency of the secondary rotor is lower than that of the primary rotor, it generates deceleration to the motor shaft; after switching on the power of the secondary stator coil, changing driving current of coil will accordingly change output torque of the secondary rotor and the motor shaft; when switching on the power of the secondary stator coil, it generates stable S->N magnetic field with permanent magnet; at this time, if switching off the power of the primary stator coil, the motor enters into braking mode.

The primary rotor is an embedded double-rotor structure comprising a primary external rotor and a primary internal rotor; the primary internal rotor is arranged inside of the primary external rotor; two ends of the primary rotor are provided with rotor end covers on which the frame oil seal and bearing are provided; the primary internal rotor, the motor shaft and the primary external rotor are connected with bearing, and the cavity between the two rotors is closed.

The primary rotor is a squirrel-cage type external rotor or permanent magnetic external rotor, the internal rotor is a squirrel-cage type internal rotor, and the secondary rotor adopts the permanent magnetic structure.

The present invention also provides another motor, comprising a stator, an internal rotor and an external rotor, wherein the internal rotor is embedded into the external rotor, with a cavity or an air gap provided between the internal and external rotors; the internal rotors adopts the conductive sleeve type internal rotor, the phase-change magnetic material is filled in the cavity of the conductive sleeve type internal rotor, the cavity is filled with magnetic phase-change material; the stator is provided outside of the external rotor, while the internal rotor is connected with output shaft of the motor; after switching on the power, the external rotor is driven by a rotating magnetic field generated by the stator to rotate at first, and then the internal rotor is driven by a rotating magnetic field generated by the external rotor to rotate; as a result, the motor shaft is driven to rotate and output kinetic energy, and the internal rotor generates induced electromagnetic field while rotating; the internal and external rotors automatically regulate magnetic phase and form a closed magnetic circuit, because the magnetic phase-change material is filled in the cavity of the conductive sleeve type internal rotor, when the motor is running after switching on the power, a flexible driving force is generated from the external rotor to the internal rotor, so as to realize flexible output of power of the motor shaft.

The present invention also provides another motor, comprising a rotor and a stator, wherein the motor adopts two groups of rotor-stator structures that are arranged coaxially; one group is a driving rotor-stator structure, including a primary stator and a primary rotor; the primary rotor is formed by embedding a primary inner rotor into a primary outer rotor, and a cavity or an air gap provided inside the primary inner rotor or between the primary inner rotor and the primary outer rotor, the primary inner rotor adopts the conductive sleeve type internal rotor, phase-change magnetic materials are filled in the conductive sleeve type internal rotor, and the primary inner rotor is connected with an output shaft of the motor; after switching on the power of the primary stator coil, the alternating current motor generates asynchronous rotating magnetic field of the primary stator, the primary outer rotor and the primary inner rotor for two times; because liquid phase-change magnetic materials is filled in the conductive sleeve type internal rotor, the primary outer rotor generates flexible driving force to the primary internal rotor and the motor shaft; the other group is a controlling stator structure comprising a secondary stator and a secondary rotor, and the secondary rotor is arranged coaxially with the primary inner rotor.

The outer part of the motor adopts standard motor base structure for large junction box, and function area for isolating the high voltage wiring pile from the low voltage circuit board and wiring terminal is arranged in the junction box, wherein the low voltage circuit board adopts a large-scale integrated circuit, a signal processor and an inverter driver to realize real-time control on motor running. The inner part of the motor adopts two groups of rotor and stator structures that are coaxially arranged, because liquid phase-change magnetic material is filled between the internal and external rotors, the primary external rotor generates flexible power driving to the primary internal rotor and the motor shaft, such that the motor has technical features of limiting current, flexible transmission (starting), controlling temperature raise, overcurrent protection, high efficiency and energy-saving performance automatically. Signal source of the motor adopts embedded high-resolution grating encoder that is arranged on the motor shaft outside of the rear end cover; the signal processor can store, analyze and feed back real-time running status precisely; by control function of the operation system or upper computer of integrated circuit of motor, so as to realize closed-loop control function including failure warning, time cycle, change of rotating speed, torque control, displacement distance and rotating direction.

BRIEF DESCRIPTION OF THE DRAWINGS

FIG. 1 is appointed to be abstract drawing of the present invention.

DETAILED DESCRIPTION OF THE PREFERRED EMBODIMENTS

Figure 1:
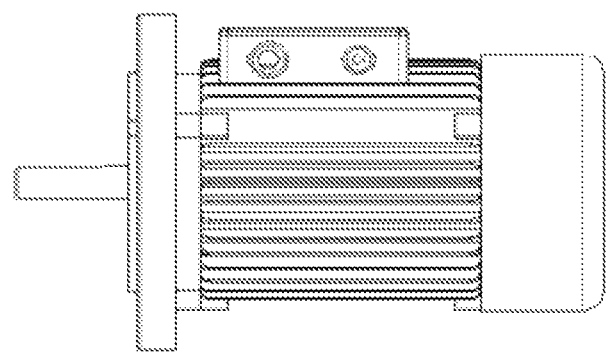
FIG. 1 is the front view of the embodiment 1 or embodiment 2
Figure 2:
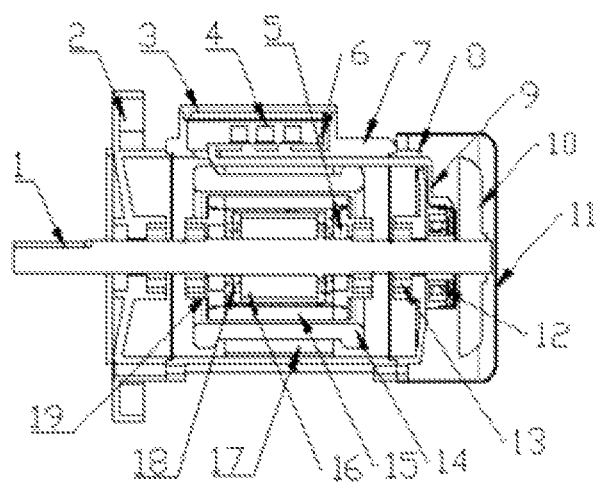
FIG. 2 is the front section view of the embodiment 1.
Figure 3:
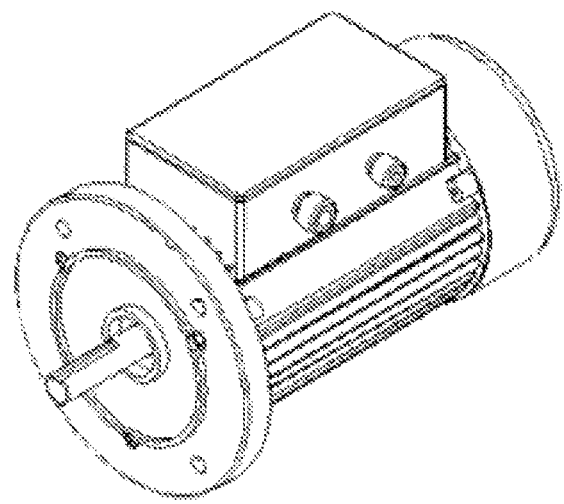
FIG. 3 is isometric axis view of the embodiment 2.
Figure 4:
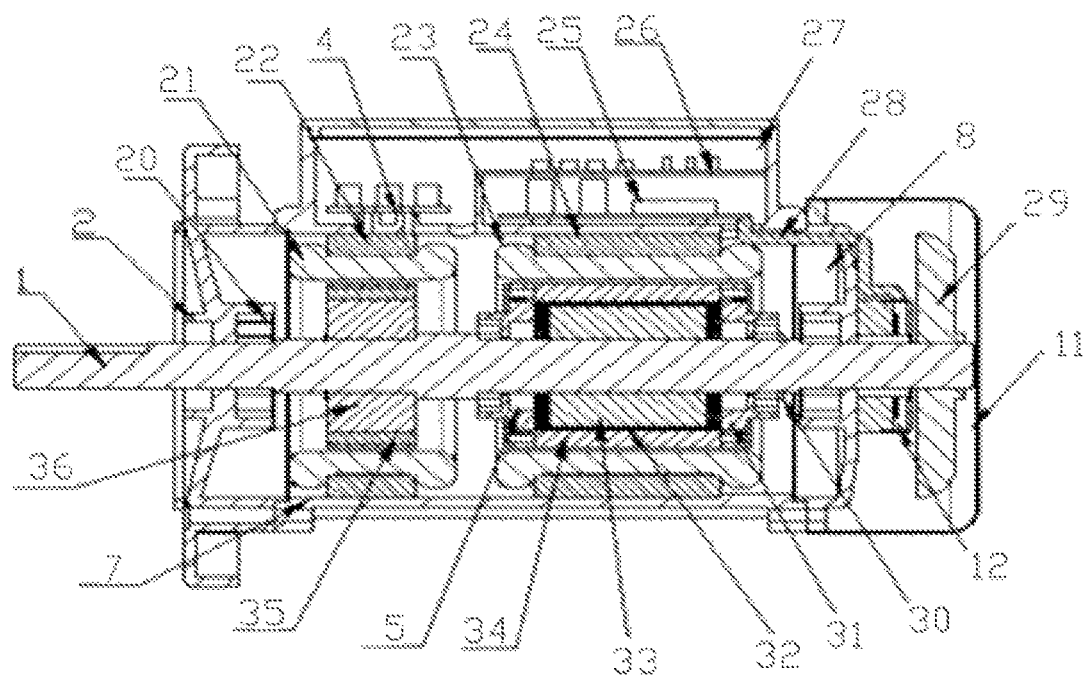
FIG. 4 is front section view of the embodiment 2.
Where: 1. motor shaft; 2. front end cover; 3. junction box; 4. high voltage wiring pile; 5. framework oil seal; 6. low voltage wiring board; 7. motor enclosure; 8. rear end cover; 9. signal cable; 10. fan blade; 11. rear fan cover; 12. grating encoder; 13. bearing; 14. stator coil; 15. external rotor; 16. internal rotor; 17. stator iron core; 18. phase-change magnetic material; 19. rotor bearing end plate; 20. main bearing; 21. control coil; 22. secondary stator; 23. power coil; 24. primary stator; 25. driving circuit board; 26. intergrated control panel; 27. junction box; 28. shielding cable; 29. fan; 30. rotor bearing; 31. rotor end cover; 32. phase-change magnetic material; 33. primary internal rotor; 34. primary external rotor; 35. permanent magnet strip; 36. secondary rotor.

The present invention is further described in combination with the drawings, and the structure and principle of the device is clear to persons skilled in the art. It should be understood that embodiments are supposed to be used to explain the present invention, but not to limit the present invention.

Embodiment 1

The present invention comprises a motor shaft, a front end cover, a junction box, a high voltage wiring pile, a framework oil seal, a low voltage wiring board, a motor enclosure, a rear end cover, a shielding signal cable, a fan blade, a rear fan cover, a grating encoder, a bearing, a stator coil, an external rotor, an internal rotor, a stator iron core, a phase-change magnetic material and a rotor bearing end plate, as well as relevant parts to form the product.

The arranging process is as follows:

a. inserting and fixing the motor shaft into the internal rotor to form an internal rotor assembly; arranging the bearing and the framework oil seal into the rotor bearing end plate to form a rotor bearing end plate assembly; inserting the internal rotor assembly into the external rotor, two ends of which are provided with the rotor bearing end plate assemblies; filling the phase-change magnetic material into the gap between the internal and external rotors to form a rotor component;

b. embedding the wound stator coil into the stator iron core to form a stator component;

c. arranging the bearing into the front end cover and the rear end cover to form a motor enclosure end cover component;

d. connecting the shielding signal cable with the grating encoder and the low voltage wiring board to form a sensor component;

e. arranging to form the complete machine: arranging the stator component into the motor enclosure, inserting the shielding signal cable into the motor enclosure through the stator iron core trunking, inserting the rotor component into the stator component, inserting the motor shaft into the motor enclosure end cover component in terms of the front and rear position and fixing it on two end surfaces of the motor enclosure; inserting the grating encoder through the motor shaft and fixing on the rear end cover of motor, arranging the low voltage wiring board inside of the junction box; connecting the grating encoder and the low voltage wiring board with the shielding signal cable, and arranging and fixing the fan blade into rear part of the motor shaft; fixedly arranging the rear fan cover on the rear end cover of the motor, and fixing the junction box cover, thus to form the complete machine product.

The digital motor is an embedded type double-rotor structure, which is an "external squirrel-cage type rotor and internal squirrel-cage type rotor" structure or an "external permanent magnetic rotor and internal squirrel-cage type rotor" structure; rotor component of the motor comprises an internal rotor and an external rotor, wherein the internal rotor is embedded in the inner space of the external rotor, and the internal rotor component is connected with the external rotor through the bearing; and the phase-change magnetic material, which is used as kinetic flexible transmission medium, is filled in the gap between the internal and external rotors.

Embodiment 2

The present invention comprises a motor shaft, a front end cover, a main bearing, a control coil, a secondary stator, a high voltage wiring pile, a power coil, a primary stator, a driving circuit board, an integrated control panel, a junction box, a shielding cable, a rear end cover, a fan, a rear fan cover, a grating encoder, a rotor bearing, a rotor end cover, phase-change magnetic material, a primary internal rotor, a primary external rotor, a frame oil seal, a permanent magnet strip, a motor enclosure and a secondary rotor, as well as relevant parts to form the product.

The present invention comprises a rotor and a stator, wherein the asynchronous motor adopts two groups of rotor-stator structures that are arranged coaxially; one group is a driving rotor-stator structure, including a primary stator and a primary rotor; the primary rotor is formed by embedding a primary inner rotor into a primary outer rotor, phase-change magnetic materials are filled into a cavity between the primary inner rotor and the primary outer rotor, and the primary inner rotor is connected with an output shaft of the motor; after switching on the power of the primary stator coil, the AC motor generates asynchronous rotating magnetic field for two times, including a primary stator magnetic field, a primary external rotor magnetic field, and a primary internal rotor magnetic field; because liquid phase-change magnetic materials are filled between the inner and outer rotors, the primary outer rotor generates flexible driving force to the primary internal rotor and the motor shaft; the other group is a controlling stator structure comprising a secondary stator and a secondary rotor, and the secondary rotor is arranged coaxially with the primary inner rotor.

One group is a power rotor-stator, comprising a primary stator and a primary rotor; the primary rotor is formed by embedding the primary internal rotor into the primary external rotor; after switching on the power of the primary stator coil, the AC motor generates asynchronous rotating magnetic field for two times, including a primary stator magnetic field->a primary external rotor magnetic field->a primary internal rotor magnetic field; because liquid phase-change magnetic materials are filled between the inner and outer rotors, the primary outer rotor generates flexible driving force to the primary internal rotor and the motor shaft, such that the motor possesses the technical features of limiting current, controlling temperature raise, flexible transmission (starting), overload protection, high efficiency and energy saving performance.

The other group is the controlling rotor-stator, comprising a secondary stator and a secondary rotor; a) after switching on the power of the secondary stator coil (AC driving), the secondary rotor generates a rotating torque having same direction with the primary rotor; the secondary rotor generates rotating torque with same direction of the primary rotor; if rotating frequency of the secondary rotor is higher than that of the primary rotor, it generates acceleration to the motor shaft; if rotating frequency of the secondary rotor is lower than that of the primary rotor, it generates deceleration to the motor shaft; b) after switching on the power of the secondary stator coil (AC driving), changing driving current of coil will accordingly change output torque of the secondary rotor and the motor shaft; c) when switching on the power of the secondary stator coil (DC driving), it generates stable S->N magnetic field with permanent magnet; at this time, if switching off the power of the primary stator coil, the motor enters into braking mode.

The detailed implementation process of the motor of the embodiment 2 as follows:

1. Inserting and fixing the motor shaft into the primary internal rotor, embedding the primary inner rotor into the primary outer rotor, arranging a rotor bearing and a frame oil seal into a rotor end cover, fixedly arranging the rotor end cover on two ends of the primary outer rotor, filling the phase-change magnetic materials into the gap between the inner and outer rotors, arranging the motor shaft through the secondary rotor, to form a rotor component;

2. Embedding the wound primary and secondary stator coils into the primary and secondary stator iron cores to form a stator component;

3. Arranging a high voltage wiring pile, a driving circuit board and an integrated control panel to form a control component;

4. Arranging the bearing into the front end cover and the rear end cover to form a motor enclosure end cover component;
5. Connecting the shielding signal cable with wiring terminals of the grating encoder and the low voltage circuit board to form a sensor component;
6. Arranging process of whole product:
   a) Arranging the stator component into the motor enclosure;
   b) Arranging the control component into the junction box;
   c) Inserting the shielding signal cable through the rear end cover of motor and the enclosure trunking to connect a low voltage wiring terminal;
   d) Inserting the rotor component into the stator component (the primary stator-rotor in accordance with the secondary stator-rotor), and connecting the primary stator coil with the high voltage wiring pile and connecting the secondary coil with the driving circuit board;
   e) Inserting the motor shaft into the motor enclosure end cover component in terms of the front and rear position and fixing it on two end surfaces of the motor enclosure;
   f) Inserting the grating encoder through the motor shaft and fixing on the rear end cover of motor, and connecting the grating encoder with the shielding signal cable;
   g) Arranging and fixing the fan blade into rear part of the motor shaft;
   h) Fixedly arranging the rear fan cover on the rear end cover of the motor;
7. Fixing the junction box cover at last, thus to finish arranging the complete machine product.

What is claimed is:

1. A motor, comprising a stator, an internal rotor and an external rotor, wherein the internal rotor is embedded into the external rotor, with a cavity provided between the internal and external rotors; the cavity is filled with magnetic phase-change material; the stator is provided outside of the external rotor, while the internal rotor is connected with output shaft of the motor; after switching on the power, the external rotor is driven by a rotating magnetic field generated by the stator to rotate at first, and then the internal rotor is driven by a rotating magnetic field generated by the external rotor to rotate; as a result, the motor shaft is driven to rotate and output kinetic energy, and the internal rotor generates induced electromagnetic field while rotating; the internal and external rotors automatically regulate magnetic phase and form a closed magnetic circuit, because the magnetic phase-change material is filled in the cavity between the internal and external rotors, when the motor is running after switching on the power, a flexible driving force is generated from the external rotor to the internal rotor, so as to realize flexible output of power of the motor shaft.

2. The motor according to claim 1, wherein specific structure of the motor is as follows:
   inserting and fixing the motor shaft into the internal rotor to form an internal rotor assembly; arranging the bearing and the framework oil seal into the rotor bearing end plate to form a rotor bearing end plate assembly; inserting the internal rotor assembly into the external rotor, two ends of which are provided with the rotor bearing end plate assemblies; filling the phase-change magnetic material into the gap between the internal and external rotors to form a rotor component;
   embedding the wound stator coil into the stator iron core to form a stator component;
   arranging the bearing into the front end cover and the rear end cover to form a motor enclosure end cover component;
   connecting the shielding signal cable with the grating encoder and the low voltage wiring board to form a sensor component;
   arranging the stator component into the motor enclosure, inserting the shielding signal cable into the motor enclosure through the stator iron core trunking, inserting the rotor component into the stator component, inserting the motor shaft into the motor enclosure end cover component in terms of the front and rear position and fixing it on two end surfaces of the motor enclosure; inserting the grating encoder through the motor shaft and fixing on the rear end cover of motor, arranging the low voltage wiring board inside of the junction box; connecting the grating encoder and the low voltage wiring board with the shielding signal cable, and arranging and fixing the fan blade into rear part of the motor shaft; fixedly arranging the rear fan cover on the rear end cover of the motor, and fixing the junction box cover, thus to form the complete machine product.

3. The motor according to claim 1, wherein the phase-change magnetic material is used as kinetic flexible transmission medium that is filled in the gap between the internal and external rotors.

4. The motor according to claim 1, wherein the internal rotor component and external rotor are connected by the bearing.

5. The motor according to claim 1, wherein the external rotor is a squirrel-cage type rotor or a permanent magnetic rotor, and the internal rotor is the squirrel-cage type rotor.

6. The motor according to claim 1, wherein the motor has starting protection and overcurrent protection, at the conditions of double rated power, 55 $Kp/cm^2$ shearing stress of phase-change material, 30 N/m locked-rotor torque, external rotor idling and internal rotor stalling, the starting peak value and overcurrent are both lower than double rated motor current.

7. A motor, comprising a rotor and a stator, wherein the motor adopts two groups of rotor-stator structures that are arranged coaxially; one group is a driving rotor-stator structure, including a primary stator and a primary rotor; the primary rotor is formed by embedding a primary inner rotor into a primary outer rotor, phase-change magnetic materials are filled into a cavity between the primary inner rotor and the primary outer rotor, and the primary inner rotor is connected with an output shaft of the motor; after switching on the power of the primary stator coil, the alternating current motor generates asynchronous rotating magnetic field of the primary stator, the primary outer rotor and the primary inner rotor for two times; because liquid phase-change magnetic materials are filled between the inner and outer rotors, the primary outer rotor generates flexible driving force to the primary internal rotor and the motor shaft; the other group is a controlling stator structure comprising a secondary stator and a secondary rotor, and the secondary rotor is arranged coaxially with the primary inner rotor.

8. The motor according to claim 7, wherein specific structure of the motor is as follows:
   inserting and fixing the motor shaft into the primary internal rotor, embedding the primary inner rotor into the primary outer rotor, arranging a rotor bearing and a frame oil seal into a rotor end cover, fixedly arranging the rotor end cover on two ends of the primary outer rotor, filling the phase-change magnetic materials into the gap between the inner and outer rotors, arranging the motor shaft through the secondary rotor, to form a rotor component;

embedding the wound primary and secondary stator coils into the primary and secondary stator iron cores to form a stator component;

arranging a high voltage wiring pile, a driving circuit board and an integrated control panel to form a control component;

arranging the bearing into the front end cover and the rear end cover to form a motor enclosure end cover component;

connecting the shielding signal cable with wiring terminals of the grating encoder and the low voltage circuit board to form a sensor component;

arranging the stator component into the motor enclosure, arranging the control component into the junction box, inserting the shielding signal cable through the rear end cover of motor and the enclosure trunking to connect a low voltage wiring terminal; inserting the rotor component into the stator component, with the primary and secondary stators being in accordance with the primary and secondary rotors; connecting the primary stator coil with the high voltage wiring pile and connecting the secondary coil with the driving circuit board; inserting the motor shaft into the motor enclosure end cover component in terms of the front and rear position and fixing it on two end surfaces of the motor enclosure; inserting the grating encoder through the motor shaft and fixing on the rear end cover of motor; connecting the grating encoder with the shielding signal cable, and arranging and fixing the fan blade into rear part of the motor shaft; fixedly arranging the rear fan cover on the rear end cover of the motor, and fixing the junction box cover, thus to finish arranging the complete machine product.

9. The motor according to claim 7, wherein the controlling stator and rotor structure is comprised of the secondary stator and the secondary rotor; when switching on the power of the secondary stator coil, the secondary rotor generates rotating torque with same direction of the primary rotor; if rotating frequency of the secondary rotor is higher than that of the primary rotor, it generates acceleration to the motor shaft; if rotating frequency of the secondary rotor is lower than that of the primary rotor, it generates deceleration to the motor shaft; after switching on the power of the secondary stator coil, changing driving current of coil will accordingly change output torque of the secondary rotor and the motor shaft; when switching on the power of the secondary stator coil, it generates stable S->N magnetic field with permanent magnet; at this time, if switching off the power of the primary stator coil, the motor enters into braking mode.

10. The motor according to claim 7, wherein the primary rotor is an embedded double-rotor structure comprising a primary external rotor and a primary internal rotor; the primary internal rotor is arranged inside of the primary external rotor; two ends of the primary rotor are provided with rotor end covers on which the frame oil seal and bearing are provided; the primary internal rotor, the motor shaft and the primary external rotor are connected with bearing, and the cavity between the two rotors is closed.

11. The motor according to claim 7, wherein the primary rotor is a squirrel-cage type external rotor or permanent magnetic external rotor, the internal rotor is a squirrel-cage type internal rotor, and the secondary rotor adopts the permanent magnetic structure.

12. A motor, comprising a stator, an internal rotor and an external rotor, wherein the internal rotor is embedded into the external rotor, with a cavity or an air gap provided between the internal and external rotors; the internal rotors adopts the conductive sleeve type internal rotor, the phase-change magnetic material is filled in the cavity of the conductive sleeve type internal rotor, the cavity is filled with magnetic phase-change material; the stator is provided outside of the external rotor, while the internal rotor is connected with output shaft of the motor; after switching on the power, the external rotor is driven by a rotating magnetic field generated by the stator to rotate at first, and then the internal rotor is driven by a rotating magnetic field generated by the external rotor to rotate; as a result, the motor shaft is driven to rotate and output kinetic energy, and the internal rotor generates induced electromagnetic field while rotating; the internal and external rotors automatically regulate magnetic phase and form a closed magnetic circuit, because the magnetic phase-change material is filled in the cavity of the conductive sleeve type internal rotor, when the motor is running after switching on the power, a flexible driving force is generated from the external rotor to the internal rotor, so as to realize flexible output of power of the motor shaft.

13. A motor, comprising a rotor and a stator, wherein the motor adopts two groups of rotor-stator structures that are arranged coaxially; one group is a driving rotor-stator structure, including a primary stator and a primary rotor; the primary rotor is formed by embedding a primary inner rotor into a primary outer rotor, and a cavity or an air gap provided inside the primary inner rotor or between the primary inner rotor and the primary outer rotor, the primary inner rotor adopts the conductive sleeve type internal rotor, phase-change magnetic materials are filled in the conductive sleeve type internal rotor, and the primary inner rotor is connected with an output shaft of the motor; after switching on the power of the primary stator coil, the alternating current motor generates asynchronous rotating magnetic field of the primary stator, the primary outer rotor and the primary inner rotor for two times; because liquid phase-change magnetic materials is filled in the conductive sleeve type internal rotor, the primary outer rotor generates flexible driving force to the primary internal rotor and the motor shaft; the other group is a controlling stator structure comprising a secondary stator and a secondary rotor, and the secondary rotor is arranged coaxially with the primary inner rotor.

* * * * *